3,423,360
PROCESS FOR THE MANUFACTURE OF POLY-
MERS STABILIZED AGAINST THE EFFECTS
OF ULTRAVIOLET RAYS
Helmut Huber, Basel, Paul Schaefer, Riehen, Hans Rudolf
Biland, Basel, Christian Luethi, Munchenstein, Karl
Eschle, Basel, and Max Duennenberger, Frenkendorf,
Switzerland, assignors to Ciba Limited, Basel, Switzer-
land, a company of Switzerland
No Drawing. Filed Nov. 22, 1965, Ser. No. 509,178
Claims priority, application Switzerland, Dec. 4, 1964,
15,740/64
U.S. Cl. 260—47                                8 Claims
Int. Cl. C08f 19/00, 45/72, 7/12

ABSTRACT OF THE DISCLOSURE

New polymers are provided which are obtained by polymerizing 0.1 to 100% of at least one compound of the formula

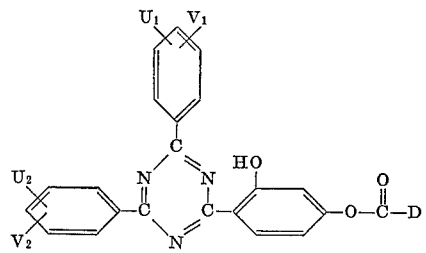

where $U_1$ and $U_2$ each represents a hydrogen atom, a chlorine atom or a methyl group, $V_1$ and $V_2$ each represents a hydrogen atom or a methyl group and D stands for a lower alkenyl group, and 99.9% to 0% of at least one other compound capable of reacting with alkenyl groups in the presence of a polymerization catalyst.

The polymers of this invention are protected from the harmful action of ultraviolet rays. The polymers of this invention are especially useful as stabilizers for protecting other organic materials from the action of ultraviolet rays.

---

It has been found that by linking alkenyl groups valuable, new polymers protected from the harmful action of ultraviolet rays are obtained when 0.1 to 100% of at least one compound of the formula (1)

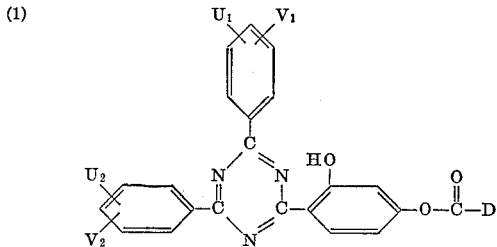

where $U_1$ and $U_2$ each represents a hydrogen atom, a chlorine atom or a methyl group, $V_1$ and $V_2$ each represents a hydrogen atom or a methyl group and D stands for a lower alkenyl group, and 99.9% to 0% of at least one other compound capable of reacting with alkenyl groups are reacted with the aid of a polymerization catalyst.

Thus, the new polymers contain 0.1 to 100% of structural elements of at least one compound of the Formula 1 and 99.9 to 0% of structural elements of at least one other polymerizable compound.

In the starting materials of the Formula 1, D represents, for example, a group of the composition —CY=CH$_2$, where Y is a methyl group or preferably a hydrogen atom. Furthermore, D may also represent the group —CH=CH—CH$_3$ or —C(C$_2$H$_5$)=CH$_2$. The methyl groups U and/or V, as well as the chlorine atom U, may be in the meta-position or preferably in the para-position, or respectively in the ortho- and para-positions, to the bond with the triazine ring, for example thus:

(2)

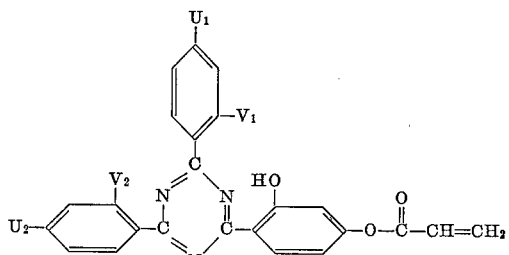

where $U_1$, $U_2$, $V_1$ and $V_2$ have the above meanings. $U_1$ and $U_2$, as well as $V_1$ and $V_2$, may be identical or different.

The hydroxyphenyltriazines of the Formula 1 may be prepared by known methods, for example by reacting a suitable 2′,4′-dihydroxyphenyltriazine with an acid halide of the formula (3)

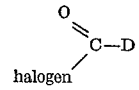

or with an acid anhydride of the formula (4)

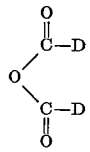

where D has the above meaning in the presence of a tertiary amine and in an inert organic solvent. Depending on the tertiary amine selected there is obtained either directly the desired compound containing the alkenyl group D—as is the case, for example, with triethylamine—or there is first formed, for example with a pyridine base, a lower alkylene group which is bound on one hand with the

group and on the other hand with a quarternary nitrogen atom belonging to the base concerned. On treatment in an aqueous alkali metal hydroxide solution the said quarternary ammonium compound readily yields the alkenyl compound.

The 2′,4′-dihydroxyphenyltriazine compounds to be reacted with the acid halides of the Formula 3 or with the acid anhydrides of the Formula 4 are known or can be prepared by known methods, for example with the use of Friedel-Crafts catalysts, from suitable compounds of the benzene series and suitable halogentriazines. As examples of compounds of the Formulae 3 and 4 there may be mentioned the halides, especially the chlorides, and the anhydrides of acrylic acid, α-methylacrylic acid (methacrylic acid), α-ethylacrylic acid and crotonic acid.

According to this invention the compounds of the Formula 1 are subjected to polymerization. They may be homopolymerized, copolymerized with other polymerizable monomers or reacted with preformed polymers by graft polymerization. The polymerization can be performed in the block, in solution or in emulsion. Thus, for example, homopolymers are generally prepared with advantage in an inert organic solvent, such as benzene.

For the copolymerization there may be used the conventional polymerizable compounds containing the atom grouping

such as vinyl esters of organic acids, for example vinyl acetate, vinyl formate, vinyl butyrate or vinyl benzoate; furthermore vinylalkyl ketones, vinyl halides such as vinyl chloride or vinylidene chloride, vinylaryl compounds such as styrene and substituted styrenes; furthermore compounds of the acrylic acid series, such as esters from acrylic acids and alcohols, for example ethyl acrylate, butyl acrylate, dodecyl acrylate, acrylonitrile or acrylic acid amide and also substituted amides of acrylic acid and methacrylic acid, chloroacrylic acid, maleic or fumaric acid. Likewise suitable are polymerizable olefines such as isobutylene, butadienes, 2-chlorobutadienes or heterocyclic compounds such as N-vinylcarbazole, N-vinylimidazole, vinylpyrrolidone or vinylpyridine; furthermore unsaturated ethers such as vinyl ethers or isobutyl-vinyl ethers. For the manufacture of copolymers there may be used one or several components. There may be prepared binary, tertiary or even more complicated copolymers. The copolymerization can be performed in the block, in solution or in emulsion, with the use of the conventional polymerizing catalysts, such as organic or inorganic peroxides, or azo catalysts, or mixtures thereof.

Valuable polymers are obtained, for example, when a mixture of ($\alpha$)=monomers of the Formula 1 according to this invention, ($\beta$)=esters of polymerizable acids that are not capable of absorbing ultraviolet rays, and ($\gamma$)=a small proportion of a free, polymerizable acid is subjected to emulsion copolymerization.

As esters of polymerizable acids ($\beta$) there are preferably used the alkyl esters of the acids of the formula (5)

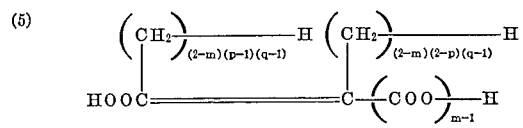

where $m$, $p$ and $q$ each is 1 or 2, that is to say of acrylic acid ($m=1$; $q=1$), crotonic acid ($m=1$; $p=1$; $q=2$), methacrylic acid ($m=1$; $p=2$; $q=2$) or fumaric acid ($m=2$). As free acids ($\gamma$) suitable for this purpose there may likewise be mentioned methacrylic acid and in the first place acrylic acid.

Apart from the monomers ($\alpha$), ($\beta$) and ($\gamma$) these copolymers ($\delta$) may contain also such monomers of different composition that contain one or several ethylenically unsaturated carbon-to-carbon bonds, preferably such as contain the atom grouping

such as vinyl esters of organic acids, for example, the vinyl esters of formic, acetic, butyric or benzoic acid; furthermore vinylalkyl ketones, vinyl halides such as vinyl chloride or vinylidene chloride, amides of acrylic or methacrylic acid, derivatives of chloracrylic acid and especially acrylonitrile or styrene.

The proportions of the components defined under ($\alpha$) to ($\gamma$) or ($\alpha$) to ($\delta$) may vary within wide limits. The proportion of the component ($\alpha$) depends substantially on the degree of light protection to be achieved. In general, a content of 1 to 60% of component ($\alpha$) is indicated. The content of free acid ($\gamma$) should be at least 1% and, in general, not exceed 10%.

In all other respects such emulsion polymerizations may be performed in the conventional manner and with the aid of the known emulsifiers and catalysts.

For the graft polymerization there may be used all polymers that lend themselves to this reaction, above all, however, polyalkylenes such as polyethylene. In other respects the graft polymerization can also be carried out with such polymers and the triazine compounds of the Formula 1 with the usual free radical-forming catalysts and in the known manner. In general, it is particularly advantageous to work in an inert organic solvent. Graft polymerization may also be used to incorporate the hydroxyphenyltriazines of the Formula 1 on the surface of polymers.

As mentioned above, the polymers may contain 0.1 to 100% of compounds of the Formula 1, and this content may be varied within this range to suit the individual purpose. Depending on whether the final polymerization product is to be used as such for a particular purpose, for example for the manufacture of shaped products, or whether it is to be a straightforward protective agent to be incorporated in another substance so as to protect the latter from ultraviolet radiation, the proportion of the polymerization component of the Formula 1 requires to be suitably adapted.

If the final polymer obtained from the compounds of the Formula 1 is to be used for protecting organic materials from the harmful effects of heat, air and especially ultraviolet rays, there are three fundamentally different ways of using it, which may be carried out either separately or in combinations:

(A) The stabilizer is incorporated with a substrate to protect the latter from the attack by ultraviolet rays, so as to prevent a change in one or more physical properties, for example discoloration, impairment of the tear strength, embrittlement or the like and/or chemical reactions triggered off by ultraviolet rays, for example oxidation. The incorporation may take place before or during the manufacture of the substrate or subsequently by a suitable operation, for example by a fixing operation similar to a dyeing process.

(B) The stabilizer is incorporated with a substrate in order to protect one or more other substances contained in the substrate, for example dyestuffs or assistants. The protection of the substrate described under (A) above may be achieved at the same time.

(C) The light filter is incorporated with a "filter layer" for the purpose of protecting a substrate placed directly underneath or at a distance from it (for example in a shop window) from the attack by ultraviolet rays. The filter layer may be solid (a film, foil or dressing) or semi-solid (a cream, oil or wax).

Thus, the process for protecting organic materials from the harmful effects of heat, air and especially ultraviolet rays consists in incorporating polymers from hydroxyphenyl-1,3,5-triazine of the Formula 1 with, or fixing on, the organic material to be protected itself or a substrate containing the said material or a filter layer placed on top of the material to be protected.

As examples of organic materials that can be protected there may be mentioned:

(a) Textile materials quite generally, which may be in any desired form e.g. in the form of fibres, filaments, yarns, woven or knitted fabrics or as felt, and all articles manufactured therefrom; such textile materials may consist of natural materials of animal origin, such as wool or silk, or of vegetable origin such as cellulose materials from cotton, hemp, flax, linen, jute and ramie; also of semi-synthetic materials such as regenerated cellulose, for example rayon, viscoses including spun rayon, or synthetic materials accessible by polymerization or copolymerization, for example polyacrylonitrile, polyvinyl chloride or polyolefins such as polyethylene and polypropylene, or those which are accessible by polycondensation, such as polyesters and above all polyamides. In the case of semi-synthetic materials it is of advantage to incorporate the protective agent already with a spinning mass, for example a viscose spinning mass, acetylcellulose spinning mass (including cellulose triacetate) and masses destined for the manufacture of fully synthetic fibers, such as polyamide melts or polyacrylonitrile spinning masses, before, during or after the polycondensation or polymerization respectively.

(b) Other fibrous materials which are not textile materials; they may be of animal origin such as feathers, hairs and pelts or hides and leathers made from the latter by natural or chemical tanning, as well as manufactured goods made therefrom; also materials of vegetable origin such as straw, wood, woodpulp or fibrous materials consisting of densified fibers, such as paper, cardboard or hardboard, as well as finished products made from the latter. Also paper pulps used in the manufacture of paper (for example hollander pulps).

(c) Coating and dressing agents for textiles and papers, for example those based on starch or casein or on synthetic resins, for example from vinylacetate or derivatives of acrylic acid.

(d) Lacquers and films of diverse composition, for example those from gelatin, acetylcellulose, cellulose propionate, cellulose butyrate or cellulose mixtures, for example cellulose acetate+butyrate and cellulose acetate+propionate; also nitrocellulose, vinylacetate, polyvinyl chloride, polyvinylidene chloride, copolymers of vinyl chloride and vinylidene chloride, alkyd lacquers, polyethylene, polypropylene, polyamides, polacrylonitrile, polyesters and the like. Another way of using the hydroxyphenyl-1,3,5-triazines is their incorporation with wrapping materials, more especially the known transparent foils of regenerated cellulose (viscose) or acetylcellulose. In this case it is as a rule advantageous to add the protective agent to the mass from which these foils are manufactured.

(e) Natural or synthetic resins, for example epoxy resins, polyester resins, vinyl resins, polystyrene resins, alkyd resins, aldehyde resins such as formaldehyde condensation products with phenol, urea or melamine; polyurethanes, as well as emulsions of synthetic resins (for example oil-in-water or water-in-oil emulsions). In this case it is of advantage to add the protective agent before or during the polymerization, polyaddition or polycondensation respectively.

(f) Hydrophobic substances containing oil, fat or wax, such as candles, floor polishes, floor stains or other wood stains, furniture polishes, especially those destined for the treatment of light-coloured, possibly bleached, wood surfaces.

(g) Natural rubber-like materials such as rubber, balata, gutta percha or synthetic, vulcanizable materials such as polychloroprene, olefinic polysulphides, polybutadiene or copolymers of butadiene+styrene (for example Buna S) or butadiene+acrylonitrile (for example Buna N) which may also contain fillers, pigments, vulcanization accelerators and the like, and in whose case the addition of the hydroxyphenyl-1,3,5-triazines aims at delaying the ageing and thus at preventing changes in the plasticity properties and embrittlement.

(h) Cosmetic preparations such as perfumes, dyed or undyed soaps and bath salts, skin and face creams, powders, repellants and especially sunburn oils and creams.

It goes without saying that the polymers are suitable as protective agents not only for undyed but also for dyed or pigmented materials; in this application the protection extends also to the dyestuffs, whereby in some cases very substantial improvements of the fastness to light are achieved. If desired, the treatment with the protective agent and the dyeing or pigmenting process may be combined.

Insofar as the above-mentioned materials are polymers prepared from alkenyl compounds, it is pointed out once again that in such a case the compounds of the Formula 1 may be polymerized into the final products instead of incorporating preformed polymers.

Depending on the kind of material to be treated, on the demands made on the efficacy and durability and other requirements the amount of stabilizer, especially of light filter, to be incorporated or copolymerized with the material concerned may vary within rather wide limits; for example, its proportion may be such that the material to be protected finally contains about 0.01 to 60%, preferably 0.1 to 2%, of compound of the Formula 1 incorporated as a polymer component.

The polymers obtained from compounds of the Formula 1 are distinguished in their use as agents protecting from ultraviolet rays above all by the following properties:

(1) The polymer constitution reduces the tendency, otherwise associated with stabilizers, of crystallizing or even bleeding in the course of time out of the substrate to be protected, both these properties leading to a mechanical weakening of the organic materials to be protected.

(2) Homopolymers of the compounds of the Formula 1 or copolymers containing a substantial proportion of such compounds (about 5 to 60%) may be used as stabilizers for organic materials for which it is otherwise difficult to find compatible stabilizers.

Since the compounds of the Formula 1 used as starting materials in the present process are new, a few methods for their manufacture are described below. In the manufacturing instructions and in the following examples parts and percentages are by weight, unless otherwise indicated.

INSTRUCTIONS FOR MANUFACTURING COMPOUNDS OF THE FORMULA 1

(A) 15 parts of 2,4 - di-(2',4'-dimethylphenyl)-6-(2'', 4''-dihydroxyphenyl-1,3,5-triazine [prepared by a double Friedel-Crafts reaction of 1 mol of cyanuric chloride with (a) 2 mols of 1,3-dimethylbenzene in meta-xylene and (b) 1 mol of resorcinol in nitrobenzene, in both cases in the presence of aluminium chloride] are dissolved with heating in 570 parts of dry benzene, and 0.01 part of thiodiphenylamine and 5.95 parts of pyridine are added to this solution. While stirring and heating a solution of 3.4 parts of acrylylchloride in 40 parts of dry benzene is slowly stirred in dropwise, and after completion of the dropwise addition the batch is heated on for ½ hour at 70° C. The precipitate formed is filtered off hot, rinsed with benzene and dried, to yield 15.2 parts of a product, melting at 196 to 198° C., of the formula (6)

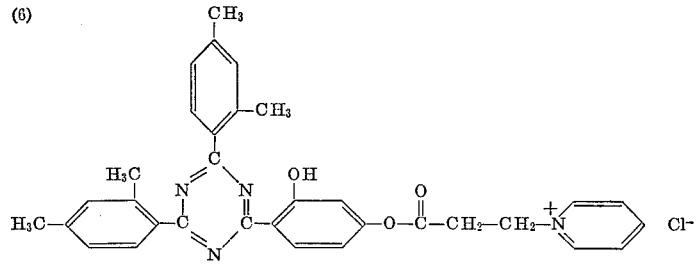

which forms a colloidal solution in water.

15 parts of the product of the Formula 6 are dissolved in 2000 parts of water by vigorous stirring and then 26 parts of 2 N-sodium hydroxide solution are added. The whole is stirred for ½ hour, suction-filtered, and the filter residue is washed with a small amount of dilute hydrochloric acid and water and dried, to yield 11 parts of a crude product which is purified by two recrystallizations from acetone with the aid of animal charcoal. The product melts at 151 to 153° C. and corresponds to the formula (7)
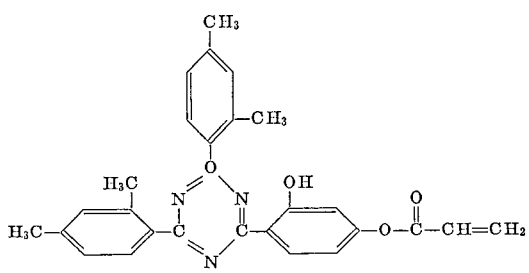

(B) The procedure is as described under (A) above, except that instead of pyridine 8.4 parts of triethylamine are added and 3.8 parts of acrylylchloride are used. The precipitated triethylamine hydrochloride is filtered off the hot reaction mixture and the solvent is completely removed in a rotary evaporator. The residue is recrystallized twice from 35 to 50 parts of acetone with the aid of active carbon, to yield 12 parts of the product of the Formula 7 melting at 154 to 155° C.

When in the above reaction acrylylchloride is replaced by an equivalent amount of acrylic anhydride, the compound of the Formula 7 is likewise obtained.

(C) 18.15 parts of 2 - (4′-chlorophenyl)-4-(2″,4″-dimethylphenyl) - 6 - (2‴,4‴-dihydroxyphenyl)-1,3,5-triazine are dissolved at 70° C. in 300 parts by volume of dry benzene. 4.77 parts of triethylamine and 0.01 part of thiodiphenylamine are added, and a solution of 4.1 parts of acrylylchloride in 60 parts by volume of dry benzene is then stirred in dropwise. The batch is heated for half an hour at 70° C., then cooled to room temperature and the triethylamine hydrochloride is suctioned off. The filtrate is evaporated under vacuum, to yield 17.4 parts (=84% of the theoretical yield) of the compound of the formula (8)
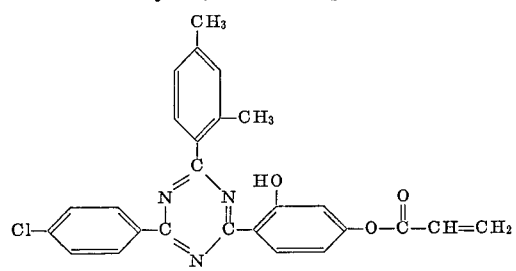

melting at 117 to 119° C. after recrystallization from cyclohexane.

$C_{26}H_{20}O_3N_2Cl$.—Calculated: C, 68,2; H, 4.4; N, 9.2%. Found: C, 68.0; H, 4.4; N, 9.1%.

$\lambda_{max}$=340 m$\mu$ ($\epsilon$=21400) —$\lambda_{max}$=415 m$\mu$ ($\epsilon$=2800)

(D) 3.5 parts of 2,4-diphenyl-6-(2′,4′-dihydroxyphenyl)-1,3,5-triazine are suspended at 70° C. in 200 parts by volume of dry benzene. 1.085 parts of triethylamine and 0.01 part of thiodiphenylamine are added, and a solution of 0.935 part of acrylylchloride in 10 parts by volume of dry benzene is then stirred in dropwise. The batch is stirred on for half an hour at 75° C., then allowed to cool to room temperature, the precipitated triethylamine hydrochloride is suctioned off, and the filtrate is evaporated under vacuum, to yield 4 parts (=98% of the theoretical yield) of the compound of the formula (9)
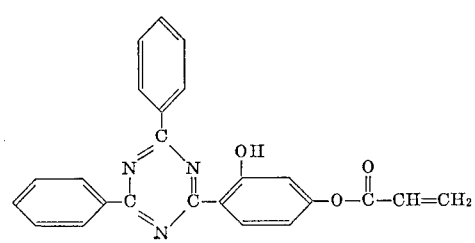

melting at 161 to 163° C. after recrystallization from ethyl acetate.

$C_{24}H_{17}O_3N_3$.—Calculated: C, 72.90; H, 4.33; N, 10.63%. Found: C, 72.76; H, 4.43; N, 10.55%.

$\lambda_{max}$=343 m$\mu$ ($\epsilon$=20800)

(E) 7 parts of 2,4-di-(4′-chlorophenyl)-6-(2″,4″-dihydroxyphenyl)-1,3,5-triazine are suspended at 70° C. in 200 parts by volume of dry benzene. 1.73 parts of triethylamine and 0.01 part of thiodiphenylamine are added, and a solution of 1.6 parts of acrylylchloride in 20 parts by volume of dry benzene is then stirred in dropwise. The batch is stirred on for half an hour at 75° C., then allowed to cool to room temperature, and the precipitated triethylamine hydrochloride is suctioned off. The filtrate is evaporated to dryness under vacuum, to yield as residue 6.6 parts (=83% of the theoretical yield) of the compound of the formula

(10)
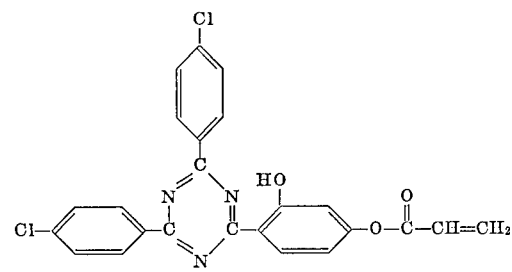

melting at 201 to 202° C. after recrystallization from toluene.

$C_{24}H_{15}O_3N_3Cl_2$.—Calculated: C, 62.1; H, 3.3; N, 9.0% Found: C, 62.0; H, 3.2; N, 9.0%.

$\lambda_{max}$=340 m$\mu$ ($\epsilon$=27800) —$\lambda_{max}$=420 m$\mu$ ($\epsilon$=2800)

(F) 15 parts of 2,4-di-(2′,4′-dimethylphenyl)-6-(2″,4″-dihydroxyphenyl)-1,3,5-triazine are dissolved at 70° C. in 250 parts by volume of dry benzene with the addition of a very small quantity of thiodiphenylamine. In the course of 20 minutes 4.15 parts of methacrylylchloride are added dropwise at 70° C. and the whole is then heated for an hour under reflux. The batch is allowed to stand overnight and filtered off from precipitated triethylamine hydrochloride. The filtrate is evaporated to dryness under vacuum, to yield 12.6 parts (=71.7% of the theoretical yield) of the compound of the formula

(11)
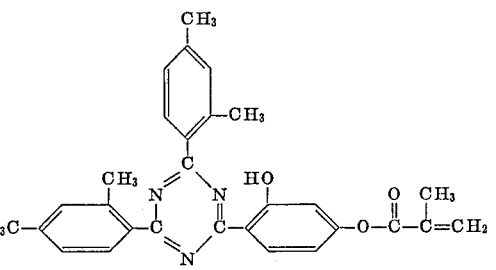

melting at 122.5° C. after recrystallization from cyclohexane.

$C_{27}H_{27}O_3N_3$.—Calculated: C, 74.8; N, 5.8; N, 9.0%. Found: C, 74.7; N, 5.8; N, 9.0%.

Example 1

5 parts of the compound of the Formula 7 are heated to 75° C. in 15 parts of benzene while being stirred under a current of nitrogen, and then polymerized by adding a solution of 0.1 part of azodiisobutyronitrile in 5 parts of benzene. After 6 hours the polymerization is complete. The polymer is precipitated with ether, suctioned off, washed with ether and dried. The polymer turns soft at 170 to 185° C. and is soluble in methylenechloride.

Example 2

A mixture of 15.8 parts of styrene, 4 parts of n-butylacrylate and 0.2 part of the compound of the Formula 7 in 42 parts of benzene is heated to 70° C. while being stirred under a current of nitrogen and then polymerized by adding a solution of 0.4 part of azodiisobutyronitrile in 4 parts of benzene. After 24 hours the polymerization is complete. When brushed over a pane of glass, this solution turns into a clear, colourless film which absorbs ultraviolet light up to about 350 m$\mu$.

Example 3

When a mixture of 19.6 parts of styrene, 5.6 parts of n-butylacrylate and 2.8 parts of the compound of the Formula 7 in 58.8 parts of benzene is polymerized by adding a solution of 0.56 part of azodiisobutyronitrile in 5.6 parts of benzene as described in Example 2, a solution is obtained which on being brushed over a pane of glass forms a clear, yellowish film which absorbs ultraviolet light up to about 350 m$\mu$.

Example 4

8.5 parts of stearyl methacrylate and 1.5 parts of the compound of the Formula 7 in 11 parts of benzene are polymerized at 85° C. by adding 0.2 part of azodiisobutyronitrile. After 6 hours a viscous solution is obtained which on being brushed over a pane of glass forms a clear, faintly yellowish film which absorbs ultraviolet light.

A mixture of 8 parts of stearyl methacrylate and 2 parts of the compound of the Formula 7 can likewise be polymerized by the method described above.

Example 5

A solution of 17.5 parts of styrene, 17.5 parts of n-butylmethacrylate, 10 parts of the compound of the Formula 7 and 5 parts of methacrylic acid in 52 parts of 1,2-dichlorethane is heated to 80° C. under a current of nitrogen and while being stirred. On addition of a solution of 0.38 part of azodiisobutyronitrile in 5 parts of 1,2- dichlorethane polymerization sets in. After 20 minutes, a solution of 0.38 part of azodiisobutyronitrile in 5 parts of 1,2-dichlorethane and after another 2 hours 0.25 part of benzoyl peroxide are added. After about 18 hours the polymerization is complete.

72 parts of the solution polymer obtained above are stirred with a solution of 3.8 parts of sodium laurylsulphate in 15 parts of water and gradually homogenized with 95 parts of water, while adjusting the pH value at 7.5 to 8.2 by adding concentrated aqueous ammonia. The batch is filtered to yield a fine dispersion having a resin dry content of 22%.

The emulsion is miscible with aqueous gelatin solution and forms with the gelatin, after drying in air, a clear, colourless film which absorbs ultraviolet light up to about 350 m$\mu$.

Example 6

25 grams of distilled styrene are prepolymerized for 2 days at 60° C. in a stoppered flask in a heating cabinet, whereupon 0.05 g. of the compound of the Formula 7 and 0.025 g. of benzoyl peroxide are slowly stirred in. The mixture is then poured into a cube-shaped mould and heated for one day at 70° C. After the mass has solidified and cooled off, the mould is broken up. The resulting block is then pressed in a hydraulic press at a temperature of 138° C. and under a pressure of 150 kg. per square centimetre to form a panel 1 mm. thick. Polystyrene panels produced in this manner are impermeable to ultraviolet light within the region from 280 to 380 m$\mu$. They are completely colourless. On exposure in a fadeometer a distinct improvement of the stability to light can be observed, since even after 200 hours' exposure the polystyrene panels referred to above do not display even a trace of yellowing, whereas control panels that do not contain the compound of the Formula 7 have turned yellow.

Example 7

5 parts of the compound of the Formula 9 yield by the process described in Example 1 a polymer which turns soft at 205 to 210° C.

Example 8

5 parts of the compound of the Formula 8 yield by the process described in Example 1 a polymer which turns soft at 225 to 235° C.

Example 9

5 parts of the compound of the Formula 10 in 64 parts of benzene yield by the process described in Example 1 a polymer which turns soft at 225 to 230° C.

Example 10

6 parts of methylmethacrylate and 5 parts of the compound of the Formula 7 in 30 parts of benzene are heated to 75° C. while being stirred under a current of nitrogen, and then polymerized by adding a solution of 0.2 part of azodiisobutyronitrile in 10 parts of benzene. After 6 hours the solution is cooled. The copolymer is precipitated with ether, suctioned off, washed with ether and dried. It turns soft between 155 and 165° C.

Example 11

When 6 parts of styrene and 5 parts of the compound of the Formula 7 in 30 parts of benzene are polymerized with a solution of 0.3 part of azodiisobutyronitrile in 15 parts of benzene at 75° C., there results after 10 hours a solution of a copolymer which is precipitated with methanol, suctioned off, washed with methanol and dried. The copolymer turns soft at 135 to 140° C.

Example 12

5 parts of n-butylmethacrylate and 5 parts of the compound of the Formula 7 in 30 parts of benzene are heated to 75° C. and then polymerized by adding a solution of 0.2 part of azodiisobutyronitrile in 5 parts of benzene. After 10 hours the solvent is distilled off under vacuum. The copolymer turns soft at 90 to 100° C.

Example 13

5 parts of polyethylene (Alkathene WNG–14) are dissolved in 45 parts of cyclohexane by being heated to 80° C. with stirring while passing a current of nitrogen. The solution is cooled to 60° C., and a solution of 0.06 part of lauroyl peroxide in 5 parts of cyclohexane is added. 10 minutes later 1 part of the compound of the Formula 8 is added. The temperature is raised to 80° C. and the mixture is heated for 4 hours at 80° C. From the hot solution the resin is precipitated by pouring it into 200 parts of acetone, then suctioned off, washed with acetone and dried. After three reprecipitations from cyclohexane+acetone the graft polymer is precipitated three times from 90 parts of xylene on each occasion by means of 90 parts of dioxane, suctioned off at 50° C., washed with dioxane and then with acetone and dried. The resulting graft polyethylene absorbs ultraviolet light and contains 8% of the compound of the Formula 8. Analysis reveals a nitrogen content of 0.67%.

The fact that in the above process the compound of the Formula 8 actually undergoes graft polymerization can be proved by the following comparative experiment:

1 part of the compound of the Formula 8 in 45 parts of cyclohexane is polymerized at 80° C. with stirring under nitrogen with a solution of 0.06 part of benzoyl peroxide in 10 parts of cyclohexane. After 4 hours 5 parts of polyethylene are added to the mixture and the whole is stirred at 80° C. until all polyethylene has dissolved. The resin is precipitated by pouring the hot solution into 200 parts of acetone, suctioned off, washed with acetone, dried and twice precipitated from 90 parts of xylene on each occasion with 90 parts of dioxan, suctioned off at 50° C., washed with dioxan and then with ether, and dried. The resulting polyethylene does not absorb ultra-

Example 14

5 parts of polyethylene are dissolved in 45 parts of cyclohexane by being heated to 80° C. with stirring under nitrogen. This solution is cooled to 70° C. and a solution of 0.02 part of lauroyl peroxide in 5 parts of cyclohexane is added to it. After 7 hours 0.5 part of the compound of the Formula 8 is added. The temperature is raised to 85° C. and the mixture is heated for 8 hours at 85° C. The resin is precipitated by pouring the hot solution into 200 parts of acetone, suctioned off, washed with acetone, dried and twice precipitated from 90 parts of xylene on each occasion with 90 parts of dioxane, suctioned off at 50° C., washed with dioxane and then with acetone, and dried, to yield a graft polyethylene which absorbs ultraviolet light and contains 4% of the compound of the Formula 8. Analysis reveals that it contains 0.35% of nitrogen.

Example 15

5 parts of polyethylene and 2 parts of the compound of the Formula 7 are dissolved in 45 parts of benzene with stirring and heating to 70° C. under nitrogen. A solution of 0.12 part of benzoyl peroxide in 5 parts of benzene is added and the temperature is raised to 85° C. After 12 hours the resin is precipitated by pouring the hot solution into 200 parts of dioxan, suctioned off, washed with dioxan, dried and precipitated twice from 90 parts of xylene on each occasion with 90 parts of dioxan, suctioned off at 50° C., washed with dioxan and then with acetone, and dried. The resulting graft polyethylene absorbs ultraviolet light and forms a clear, faintly yellowish film.

If the graft polymerization is carried out as described above but with 2 parts of the compound of Formula 11 instead of 2 parts of the compound of Formula 7 an ultraviolet light absorbing polymer is likewise obtained.

Example 16

10 parts of acrylonitrile, 37 parts of n-butylacrylate, 2 parts of acrylic acid, 1 part of the compound of the Formula 7 and 15 parts of methylenechloride are pre-emulsified in a solution of 2.5 parts of sodium laurylsulfonate in 69 parts of water, heated with stirring under nitrogen to 60° C., and a solution of 0.12 part of potassium peroxide disulfate in 2.5 parts of water and a solution of 0.035 part of sodium metabisulfite in 2.5 parts of water are added. 45 minutes later another solution of 0.12 part of potassium peroxide disulfate in 2.5 parts of water and another solution of 0.035 part of sodium metabisulfite in 2.5 parts of water are added and the mixture is further polymerized for 5 hours, then cooled, adjusted to a pH value of 7 by means of concentrated aqueous ammonia, and a small amount (0.5 part) of coagulate is filtered off under pressure. The finely dispersed latex leaves on a pane of glass a clear, faintly yellowish film which absorbs ultraviolet light.

Example 17

A mixture of 100 parts of polyethylene (Alkathene WNG-14) and 4 parts of the copolymer obtained as described in the second paragraph of Example 4 is rolled to and fro on a calender at 140° C. to form a foil, which is then pressed at 130 to 140° C. and under a pressure of 20 kg. per square centimetre to form a panel 1 mm. thick. The panel obtained in this manner is practically impermeable to ultraviolet light and reveals no sign of yellowing after having been exposed for 1000 hours in a Xeno test apparatus. The copolymer is very stable towards migration, since even after half a year's storage no trace of bled out or exuded light filter can be detected on its surface.

Example 18

A mixture of 100 parts of polypropylene (Shell, CMF7929) and 0.5 part of the polymer obtained as described in Example 9 is worked into a foil on a calender at 170° C., and the foil is then pressed to form a panel 1 mm. thick at 230 to 240° C. and under a pressure of 40 kg. per square centimetre. The panel obtained in this manner is substantially impermeable to ultraviolet light. Even after 1000 hours' Xeno testing it reveals no fissuring such as can invariably be observed with unprotected panels under identical conditions. Moreover, the treatment with perchlorethylene at 30° C. for 30 minutes elutes only a small amount, that is to say about 4%, of the ultraviolet filter incorporated in the polypropylene, whereas with foils containing the conventional monomolecular ultraviolet absorbers the extraction removes at least twice the amount and often even the whole.

Example 19

By means of a high-speed stirrer 1% of the polymer described in Example 11 is worked into a nitrolacquer having the following composition:

15 parts of ester-soluble collodion wool of low viscosity, consisting of 65% of nitrocellulose (with a nitrogen content of 12%) and 35 parts of butanol,
3 parts of dibutyl phthalate,
10 parts of arachis alkyd resin with an arachis oil content of 42%,
8 parts of ketone-formaldehyde condensation resin having a softening point of 100° C.,
18 parts of butyl acetate,
10 parts of acetone,
3 parts of butanol,
2 parts of ethyleneglycol monoethyl ether,
10 parts of xylene,
15 parts of toluene,
6 parts of isopropanol,
1 part of silicone oil, 1% solution in toluene.

The lacquer is applied by means of a spraying pistol to pinewood and protects it from becoming darker, as could be ascertained by means of comparative tests (exposure in a Fadeometer for 50 hours in comparison with a lacquer of the same composition containing no ultraviolet protecting agent).

What is claimed is:

1. An addition polymer containing (a) 0.1 to 100% of structural elements of at least one compound of the formula

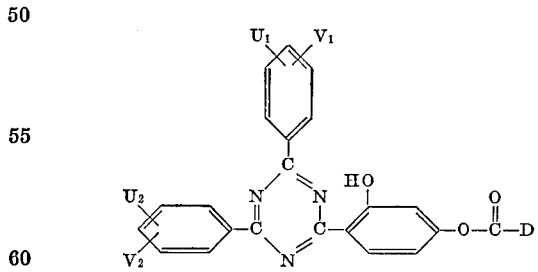

wherein $U_1$ and $U_2$ each represents a member selected from the group consisting of a hydrogen atom, a chlorine atom and a methyl group, $V_1$ and $V_2$ each represents a member selected from the group consisting of a hydrogen atom and a methyl group and D represents a lower alkenyl group, and (b) 99.9 to 0% of structural elements of at least one other polymerizable compound, said addition occurring through the alkenyl group.

2. A polymer as claimed in claim 1 containing (a)

0.1 to 100% of structural elements of a compound of the formula

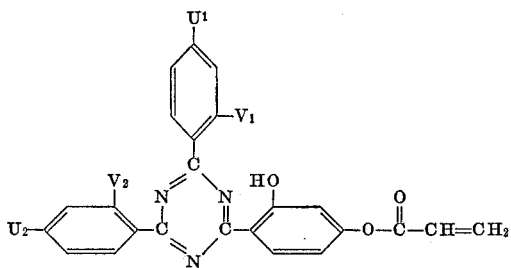

wherein $U_1$ and $U_2$ each represents a member selected from the group consisting of a hydrogen atom, a chlorine atom and a methyl group and $V_1$ and $V_2$ each represents a member selected from the group consisting of a hydrogen atom and a methyl group, and (b) 99.9 to 0% of structural elements of at least one other polymerizable compound.

3. A polymer as claimed in claim 1, containing (a) 0.1 to 100% of structural elements of the compound of the formula

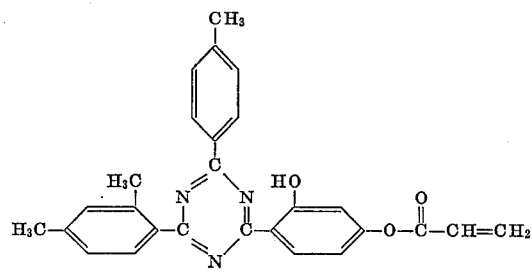

and (b) 99.9 to 0% of structural elements of at least one other polymerizable compound.

4. A polymer as claimed in claim 1, containing (a) 0.1 to 100% of structural elements of the compound of the formula

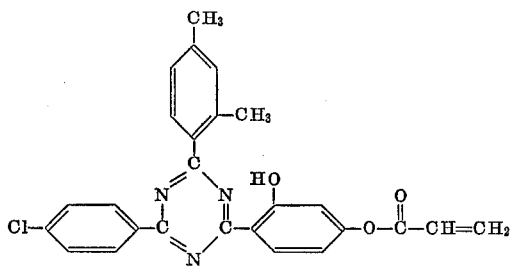

and (b) 99.9 to 0% of structural elements of at least one other polymerizable compound.

5. A polymer as claimed in claim 1, containing (a) 0.1 to 100% of structural elements of the compound of the formula

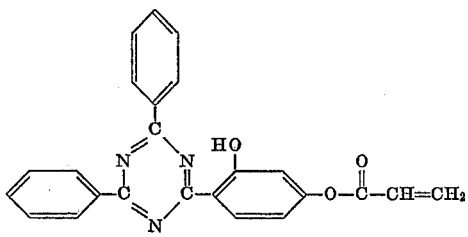

and (b) 99.9 to 0% of structural elements of at least one other polymerizable compound.

6. A polymer as claimed in claim 1, containing (a) 0.1 to 100% of structural elements of the compound of the formula

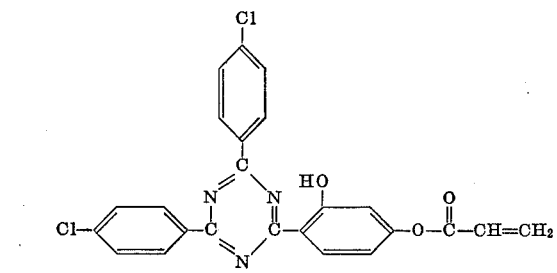

and (b) 99.9 to 0% of structural elements of at least one other polymerizable compound.

7. A polymer as claimed in claim 1, containing (a) 0.1 to 99% of structural elements of a compound of the formula

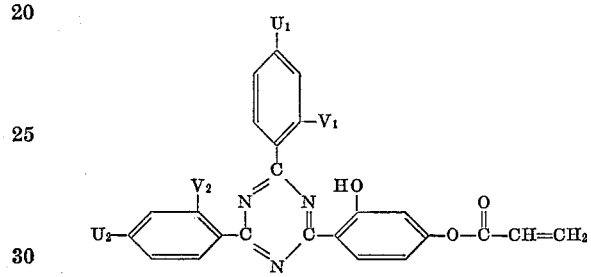

wherein $U_1$ and $U_2$ each represents a member selected from the group consisting of a hydrogen atom, a chlorine atom and a methyl group and $V_1$ and $V_2$ each represents a member selected from the group consisting of a hydrogen atom and a methyl group, and (b) 99.9 to 1% of structural elements of a methacrylic acid alkyl ester.

8. A polymer as claimed in claim 1, containing (a) 0.1 to 99% of structural elements of a compound of the formula

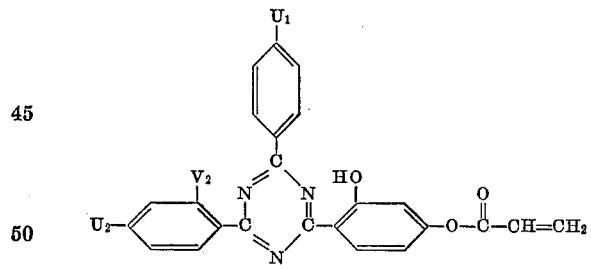

wherein $U_1$ and $U_2$ each represents a member selected from the group consisting of a hydrogen atom, a chlorine atom and a methyl group and $V_1$ and $V_2$ each represents a member selected from the group consisting of a hydrogen atom and a methyl group, and (b) 99.9 to 1% of structural elements of styrene.

References Cited

UNITED STATES PATENTS 2,899,406    8/1959    De Benneville et al.
3,272,891    9/1966    Milionis et al.

JOSEPH L. SCHOFER, *Primary Examiner.*

HARRY WONG, JR., *Assistant Examiner.*

U.S. Cl. X.R.

117—121, 124, 138.5, 138.8, 140, 142, 145, 155, 161; 260—17, 45.8, 63, 67.5, 78.5, 80.3, 82.1, 85.5, 85.7, 86.1, 87.5, 87.7, 88.1, 248, 838, 857, 858, 861, 875, 878, 882, 895, 898, 899; 424—59, 69, 78

UNITED STATES PATENT OFFICE
CERTIFICATE OF CORRECTION

Patent No. 3,423,360                                                   January 21, 1969

Helmut Huber et al.

It is certified that error appears in the above identified patent and that said Letters Patent are hereby corrected as shown below:

Column 13, lines 25 to 33, the upper portion of the formula should appear as shown below:

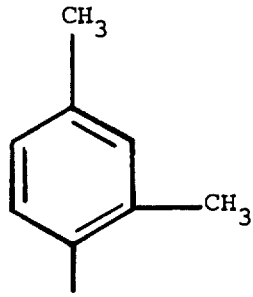

Column 14, lines 40 to 51, the upper portion of the formula should appear as shown below:

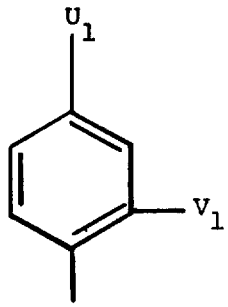

Signed and sealed this 7th day of April 1970.

(SEAL)
Attest:

EDWARD M. FLETCHER, JR.                                WILLIAM E. SCHUYLER, JR.
Attesting Officer                                               Commissioner of Patents